Figure 4:
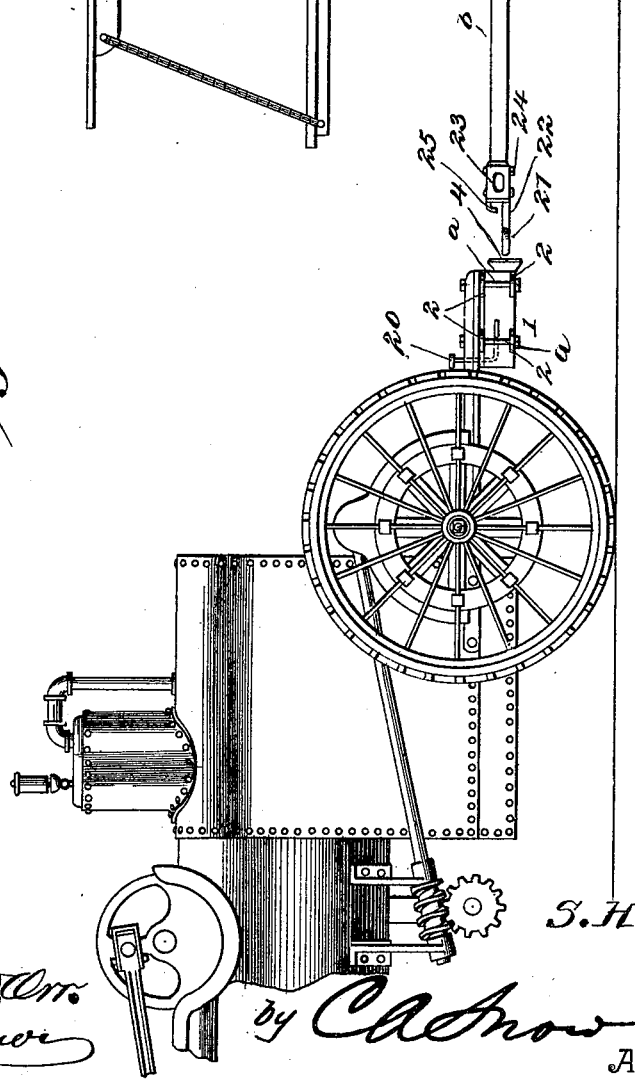

No. 665,294. Patented Jan. 1, 1901.
S. H. WILLIAMS.
COUPLING FOR TRACTION ENGINES.
(Application filed May 24, 1900.)
(No Model.) 2 Sheets—Sheet 1.
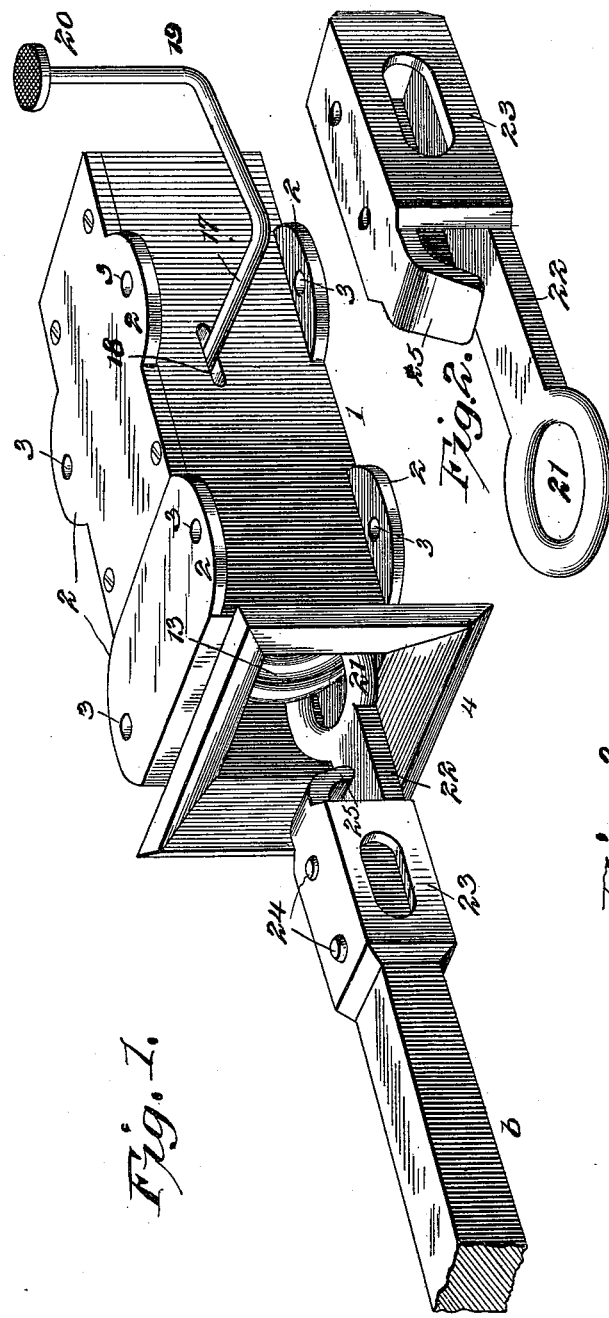
Witnesses
Howard D. Orr
J. W. Garner
S. H. Williams, Inventor.
by C. A. Snow & Co.
Attorneys
THE NORRIS PETERS CO., PHOTO-LITHO., WASHINGTON, D. C.

No. 665,294. Patented Jan. 1, 1901.
S. H. WILLIAMS.
COUPLING FOR TRACTION ENGINES.
(Application filed May 24, 1900.)
(No Model.) 2 Sheets—Sheet 2.

Witnesses
Howard D. Orr.
J. W. Garner

S. H. Williams,
Inventor,
by C. A. Snow & Co.
Attorneys

UNITED STATES PATENT OFFICE.

SANDFORD HOWARD WILLIAMS, OF MINNEAPOLIS, MINNESOTA.

COUPLING FOR TRACTION-ENGINES.

SPECIFICATION forming part of Letters Patent No. 665,294, dated January 1, 1901.

Application filed May 24, 1900. Serial No. 17,903. (No model.)

*To all whom it may concern:*

Be it known that I, SANDFORD HOWARD WILLIAMS, a citizen of the United States, residing at Minneapolis, in the county of Hennepin and State of Minnesota, have invented a new and useful Coupler for Traction-Engines, of which the following is a specification.

My invention is an improved coupler for traction and agricultural engines, the object of my invention being to provide an improved coupler, which is adapted to couple a traction or agricultural engine to the draft-pole of a harvesting or other machine or vehicle, which is automatic in its operation and is adapted for readily uncoupling the machine from the engine at will.

My invention consists in the peculiar construction and combination of devices hereinafter fully set forth, and pointed out in the claims.

In the accompanying drawings, Figure 1 is a perspective view of a coupler constructed in accordance with my invention. Fig. 2 is a detail perspective view of the coupling-link. Fig. 3 is a vertical longitudinal sectional view of my improved coupler. Fig. 4 is a side elevation of portions of a traction-engine and threshing-machine provided with my improved coupling devices.

In the embodiment of my invention I provide a draw-head 1, which has laterally-extending lugs or ears 2 on its upper and lower sides provided with bolt-holes, as at 3, and the same is secured centrally under the platform of a traction-engine by means of bolts *a*, as shown in Fig. 4. The draw-head is provided with the flared mouth 4. Near the inner end of the draw-head is a partition 5. A longitudinally-disposed rod 6 extends through a central opening in the partition 5, and the head of said rod is swiveled in a U-shaped keeper 7, to which is pivoted the inner end of a draw-bar 8. A coiled extensile spring 9 is placed on the extended shank of the rod 6 and is secured thereon by a disk or washer 10 and key 11. The said spring bears between said washer 10 and a similar washer 12 against the partition 5, and the said spring is of sufficient strength and size to sustain the draft of the engine.

The draw-bar is provided at its outer end, which is disposed just within the flared mouth of the draw-head, with a downward-extending inwardly-inclined draw-hook 13, which is normally in engagement with the lower side of the draw-head. A hook 14 also depends from the draw-bar at a suitable distance from the hook 13 and is inclined in the reverse direction, said hook 14 being longer than the hook 13 and projecting downward through an opening 15 in the bottom of the draw-bar. A spring 16 is secured in the draw-head, bears downward on the draw-bar, and keeps the same normally in the position hereinbefore described, and shown in Fig. 3.

The pivot 17 for the draw-bar is formed by a rod which extends transversely through longitudinally-disposed openings 18 in the sides of the draw-head, and one end of the said rod is turned rearward and upturned to form a crank-arm 19, which is provided with a pedal 20. The draw-bar is secured firmly to the said rod 17, and by partly turning the latter by depressing the crank-arm 19 thereof the draw-bar may be raised in the draw-head, as will be understood, in order to disengage the hook 13 from the eye 21 of the link 22. The said link 22 is a bar which is provided at the end opposite the eye 21 with a box or housing 23, forming a socket for the outer end of the draft pole or tongue *b* of a threshing or other machine or a vehicle, as the case may be. Bolts 24 secure the box or housing on the end of the tongue, as shown, and the box or housing is provided on its upper side at its front end with a downturned lip or hook 25, which is adapted to retain the link or ring of a neck-yoke or other hold-back devices employed when a team is harnessed to the machine or vehicle. In practice machines or vehicles which are to be at times attached to and drawn by a traction or agricultural engine by my improved coupler are permanently provided with links 22, constructed as hereinbefore described.

It will be understood that when the tongue provided with the draft-link 22 is run into the mouth of the draw-head, which is usually done by backing the traction-engine, the eye 21, by engagement with the outer side of the inclined draw-hook 13, passes under the latter, thereby raising the outer end of the draw-bar, and contacts with the hook 14, the spring 16 and the weight of the draw-bar causing the latter to drop as soon as the outer side of the eye 21 clears the under end of the draw-hook 13, whereupon the latter descends in the eye 21, as shown in Figs. 1 and 3, thereby coupling the tongue of the machine or vehicle to the traction or agricultural engine. When descending an incline and the tongue b moves forward, the outer side of the eye 21 engages the outer side of the inclined hook 14, the latter serving as a stop for the coupling or draft link, and the pressure of the latter against the inclined side of the hook 14 serves to keep the draw-head in the depressed position hereinbefore described, and shown in Fig. 3, thereby effectually preventing the link from becoming uncoupled from the draw-head. In the event that it becomes necessary to uncouple the engine from the machine or vehicle this may be instantly accomplished by depressing the crank-arm 19 of shaft-rod 17, thereby raising the outer end of the draw-head, so that the hook 13 is disengaged from the eye 21 of the coupling-link, and while the draw-head is in this position upon starting the traction-engine the link will be drawn out from the draw-head, as will be understood.

Having thus described my invention, I claim—

1. In a coupler of the class described, a coupling link or bar having an eye at its front end, a box or housing at its rear end forming a socket to receive the end of a draft pole or tongue, and a downturned hook at the front side of the said box or housing above the said coupling link or bar, substantially as described.

2. In a coupler of the class described, the draw-head having the partition, the longitudinally-disposed rod in an opening in said partition, a spring drawing inward on said rod, a keeper attached to the outer end of said rod, a rock-shaft extending transversely through openings in said keeper and through slots in the sides of the draw-head, and a draw-bar fast on said rock-shaft, the latter forming the pivot thereof, and said draw-bar having the downturned hooks 13, 14 in combination with a coupling bar or link having an eye adapted to be engaged by the said hook 13, substantially as described.

In testimony that I claim the foregoing as my own I have hereto affixed my signature in the presence of two witnesses.

SANDFORD HOWARD WILLIAMS.

Witnesses:
C. W. SEVILLE,
VERN BOOTH.